United States Patent
Leary

(10) Patent No.: US 6,425,133 B1
(45) Date of Patent: Jul. 23, 2002

(54) METHOD FOR CONFIGURING CABLE TELEVISION CONVERTER TERMINAL USING MULTIPLE CHANNELS AND ARRANGEMENT THEREFOR

(75) Inventor: Patrick J. Leary, Horsham, PA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 09/164,577

(22) Filed: Oct. 1, 1998

(51) Int. Cl.[7] .............................................. H04N 7/173
(52) U.S. Cl. ........................ 725/132; 725/151; 725/152; 725/131
(58) Field of Search ................................ 348/6, 10, 12; 455/3.1, 5.2; 725/95, 100, 104, 131–2, 151, 152, 126

(56) References Cited

U.S. PATENT DOCUMENTS

| 4,712,239 A | * | 12/1987 | Frezza et al. | 380/20 |
| 5,003,591 A | * | 3/1991 | Kauffman et al. | 380/10 |
| 5,247,364 A | * | 9/1993 | Banker et al. | 358/191.1 |
| 5,440,632 A | * | 8/1995 | Bacon et al. | 380/20 |
| 5,491,748 A | * | 2/1996 | Auld, Jr. et al. | 380/15 |
| 5,497,187 A | * | 3/1996 | Banker et al. | 348/6 |
| 5,579,055 A | * | 11/1996 | Hamilton et al. | 348/476 |
| 5,771,064 A | * | 6/1998 | Lett | 348/10 |

FOREIGN PATENT DOCUMENTS

EP     0399200     4/1990

* cited by examiner

*Primary Examiner*—Chris Grant
*Assistant Examiner*—Ngoc Vu
(74) *Attorney, Agent, or Firm*—Rader, Fishman & Grauer PLLC; Ronald P. Kananen, Esq.

(57) ABSTRACT

A converter terminal is configured, for example, to receive and descramble premium cable television channels or to receive data services over the cable network. The converter terminal is configured by transmitting an abbreviated set of configuration data on an out-of-band control channel. This abbreviated set of configuration information includes an instruction to tune the terminal to a higher-bandwidth in-band data channel, which is used to transmit the remainder of the configuration data. With a substantial amount of the configuration information transmitted using a faster connection, configuration can be achieved in less time. In addition, the larger bandwidth facilitates the transmission of multiple sets of configuration information corresponding to different models of cable television converter terminals.

16 Claims, 4 Drawing Sheets

METHOD FOR CONFIGURING CABLE TELEVISION CONVERTER TERMINAL USING MULTIPLE CHANNELS AND ARRANGEMENT THEREFOR

FIELD OF THE INVENTION

The present invention relates to the field of cable television converter terminals. More particularly, the present invention relates to the remote programming or configuration of such terminals.

BACKGROUND OF THE INVENTION

Many cable television service providers use devices known as converter terminals to convert cable television signals into a very high frequency (VHF) signal which can be used by conventional television equipment. An example of a converter terminal is depicted in FIG. 1 at reference number 100.

The converter terminal 100 receives cable television signals through an input port 102. The cable television signals are provided to a signal processor 104 which includes a tuner. The tuner of the signal processor 104 is capable of selecting one of the various channels included in the incoming cable television signal for display on a television. The signal, audio and video, for the selected or tuned channel is provided to a signal decoder 108, which, in turn, provides the signal to one or more output ports 106 to which a television or a video cassette recorder (VCR) may be connected.

A typical cable television service provider may offer several tiers of service at differing monthly rates. For example, most basic subscription plans include broadcast stations, such as major television networks, as well as other cable channels. By paying an additional monthly fee, a subscriber may receive access to other channels, known in the industry as premium channels. Providers typically offer multiple tiers of premium channels, such as "extended basic" programming, movie channels, and pay-per-view events.

To control access to these different levels of service, providers can transmit, to each subscriber, only those signals corresponding to subscribed services. This approach to controlling access, however, involves using dedicated transmission equipment for each subscriber. As the number of subscribers increases, the cost of this equipment becomes prohibitively expensive.

A more popular approach involves transmitting a common set of signals to all subscribers which includes all the channels offered by the provider. Under such an approach, premium channels are typically scrambled to ensure that only customers who subscribe to premium services can enjoy them. Cable television subscribers who do not pay for premium channels receive scrambled signals, which are difficult to render on a television. Premium subscribers, on the other hand, have converters that are upgraded to descramble the scrambled signals so that they, too, can be viewed.

Consequently, each subscriber's converter terminal must be configured and programmed to provide only those services for which the subscriber has paid. Additionally, periodic changes and upgrades which occur in the normal life of the cable system may call for changes in the configuration and programming of the converter terminals.

Obviously, it is more time and cost effective to configure converter terminals remotely using the cable network itself rather than have a service-person visit and upgrade each subscriber's converter terminal. Consequently, one conventional approach to configuring converter terminals involves using an out-of-band control channel to transmit a sequence of commands to the converter terminal to configure the terminal.

This control channel, however, is limited in bandwidth. Therefore, with an increase in the capabilities and features which the terminal is to be configured to provide, the volume of data transmitted to each terminal over the out-of-band control channel grows. This necessarily slows the configuration process.

The bandwidth limitation poses a particular problem when several different types of converter terminals using different command sets or configuration parameters are serviced by the same out-of-band control channel. In this case, the already limited bandwidth is split between different versions of configuration parameters and command sequences, further slowing the configuration process.

Consequently, there is a need in the art for a method of remotely configuring converter terminals which is faster and less burdensome than that historically provided by the sole use of an out-of-band control channel.

SUMMARY OF THE INVENTION

Accordingly, it is an object of the present invention to meet the above-described needs and others. Specifically, it is an object of the present invention to provide a method of remotely configuring converter terminals which is faster and less burdensome than conventional methods.

Additional objects, advantages and novel features of the invention will be set forth in the description which follows or may be learned by those skilled in the art through reading these materials or practicing the invention. The objects and advantages of the invention may be achieved through the means recited in the attached claims.

According to one embodiment, the present invention is directed to a method for configuring a cable television converter terminal. A first signal channel, e.g. the traditional out-of-band control channel, is used to transmit a first set of configuration data that includes a first command. When executed by the cable television converter terminal, the first command causes the cable television converter terminal to tune to a second channel for receiving additional configuration data. Preferably, the second signal channel has a bandwidth higher than the bandwidth of the first signal channel.

Another method embodiment deals with the situation in which different configuration data must be sent to terminals which are to be configured differently. According to this embodiment, a first signal channel is used to transmit a first set of configuration data to the converter terminal. The first set of configuration data includes at least one designator which corresponds to the manner in which the receiving converter terminal is to be configured. A command is also transmitted using the first signal channel which instructs the cable television converter terminal to tune to a second signal channel having a bandwidth higher than a bandwidth of the first signal channel.

The second signal channel transmits additional various sets of additional configuration data. Each such set of secondary configuration data corresponds to a particular a particular manner in which a converter terminal is to be configured. The designator received by the converter terminal over the first signal channel will correspond to the set of secondary configuration data on the second channel which should be used to configure the particular converter terminal. Thus, the converter terminal can ignore all secondary configuration data sets on the second channel until the secondary configuration data set corresponding to the designator is transmitted.

BRIEF DESCRIPTION OF THE DRAWINGS

These and other aspects and advantages of the present invention will become apparent upon reading the following detailed description and upon reference to the drawings which are a part of the specification. In the drawings.

Figure 1:
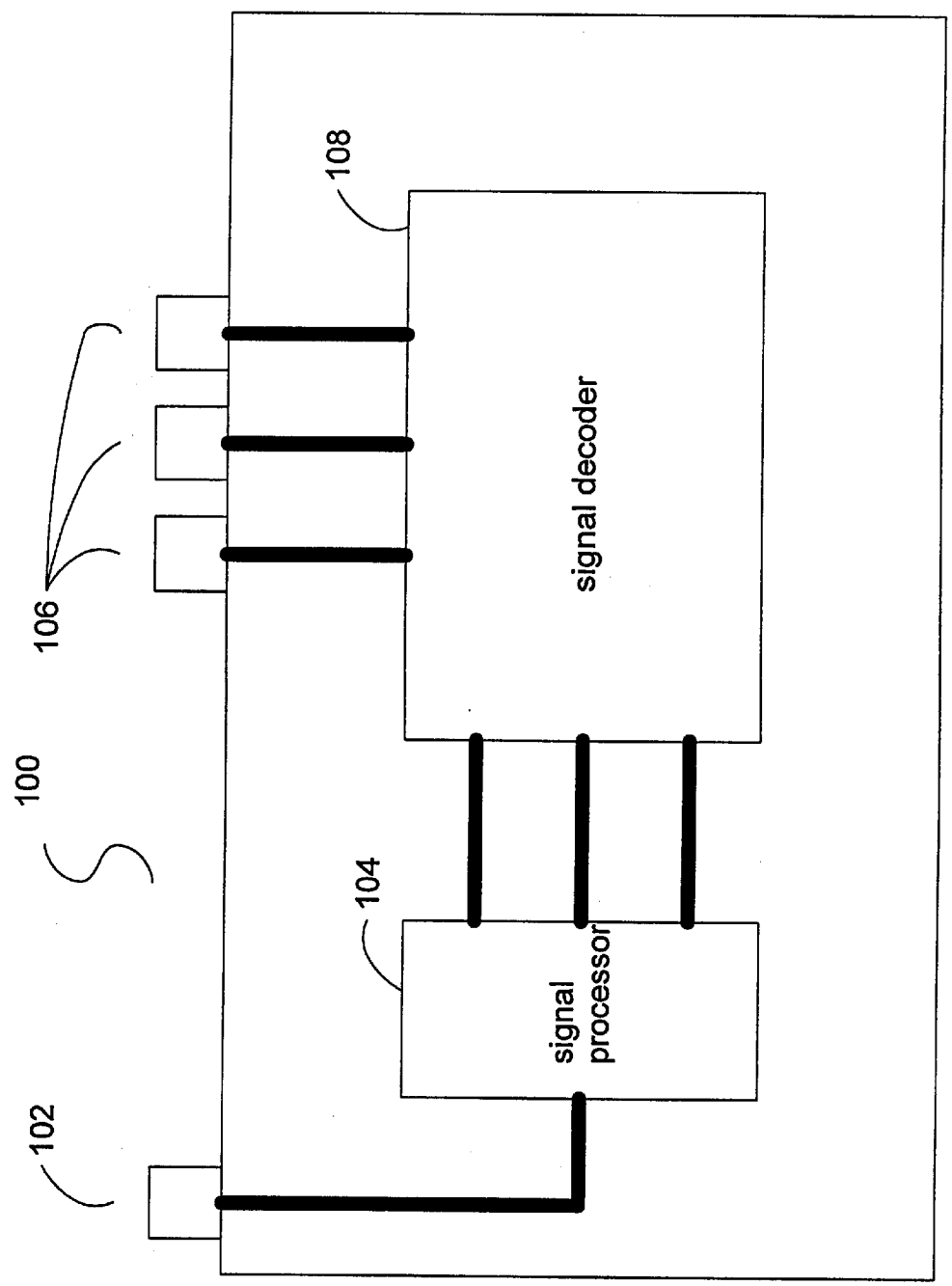
FIG. 1 illustrates an example of a conventional cable television converter terminal.

The invention is amenable to various modifications and alternative forms. Specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by appended claims.

DETAILED DESCRIPTION OF THE PREFERRED EMBODIMENTS:

The present invention is applicable to a variety of cable television systems and arrangements. The invention has been found to be particularly advantageous in cable systems in which different types of cable television terminals receive signals from a common transmitter. Additionally, the present invention may be applicable to data services, as opposed to video services, carried by service providers. For example, the present invention may be used when an electronic program guide, internet access or terminal operating code is provided by a cable television system over the cable network. An appreciation of various aspects of the invention can be gained through a discussion of various application examples.

Figure 2:
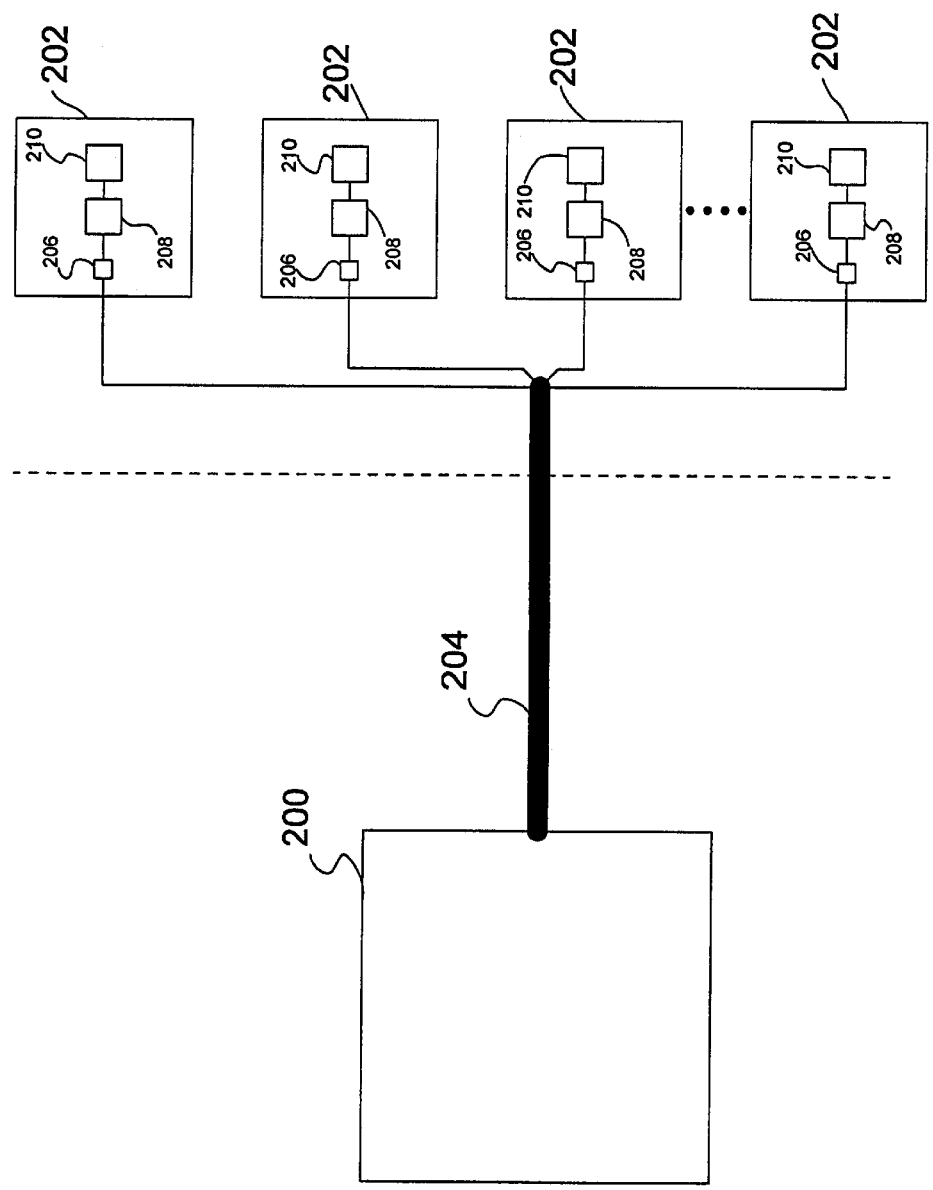
FIG. 2 illustrates an example cable television system in which command sequences are transmitted according to an embodiment of the present invention.

Referring again to the drawings, FIG. 2 depicts an exemplary cable television system in which control signals are transmitted according to an embodiment of the present invention. A transmitter 200 transmits cable television signals using a number of signal channels to all subscribers in a selected geographical area. While FIG. 2 illustrates a single transmitter 200, it should be understood that, consistent with the principles of the present invention, a cable television system can use multiple transmitters to transmit. the cable television signals.

These signals include configuration or control signals as well as television programming signals and are generally transmitted using a single cable 204, such as a fiber optic cable. Signals providing an electronic program guide or internet access may also be carried over cable 204. The cable 204 is split to supply the signals to multiple subscribers through cable television converter terminals 202.

According to a particular embodiment of the present invention, the cable television converter terminals 202 are each of the same type. In another embodiment, the cable television converter terminals 202 are of different types that recognize different types of control signals.

Each cable television converter terminal 202 includes a tuner 206, which extracts a single signal channel from the signals received from the cable 204. A signal processor 208 generates output signals, including video and/or audio signals, based on the extracted signal channel. The signal processor 208 also interprets control signals received from the cable 204 to, for example, instruct the cable television converter terminal 202 to descramble premium service signals.

A signal decoder 210 optionally performs further processing on the output signals. For example, in response to receiving the appropriate instruction, the signal decoder 210 descrambles programming signals corresponding to premium or pay-per-view services. The output signal is then provided to an external device such as a television or VCR (not shown).

As described above, in a traditional cable television system, control signals containing command sequences are transmitted on an out-of-band control channel lying outside the range of frequencies used for transmitting programming signals. According to an embodiment of the present invention, the command sequence transmitted on the out-of-band control channel is abbreviated and includes an instruction to tune the cable television converter terminal 202 to an in-band data channel, which lies within the frequency range used to transmit programming signals. The remainder of the configuration information, which can include commands and/or other types of information is then provided on the in-band data channel.

The in-band channel has a much greater bandwidth than the out-of-band channel. Therefore, data is transmitted at a higher rate than on the out-of-band control channel. Consequently, the remainder of the configuration information needed by the cable television converter terminal 202 is obtained in less time, e.g., 25% faster.

After the configuration information is obtained, the cable television converter terminal 202 optionally remains tuned to the in-band channel to receive programming signals. Alternatively, the cable television converter terminal can be tuned either to a different in-band channel or to the out-of-band control channel to receive additional configuration data.

Figure 3:
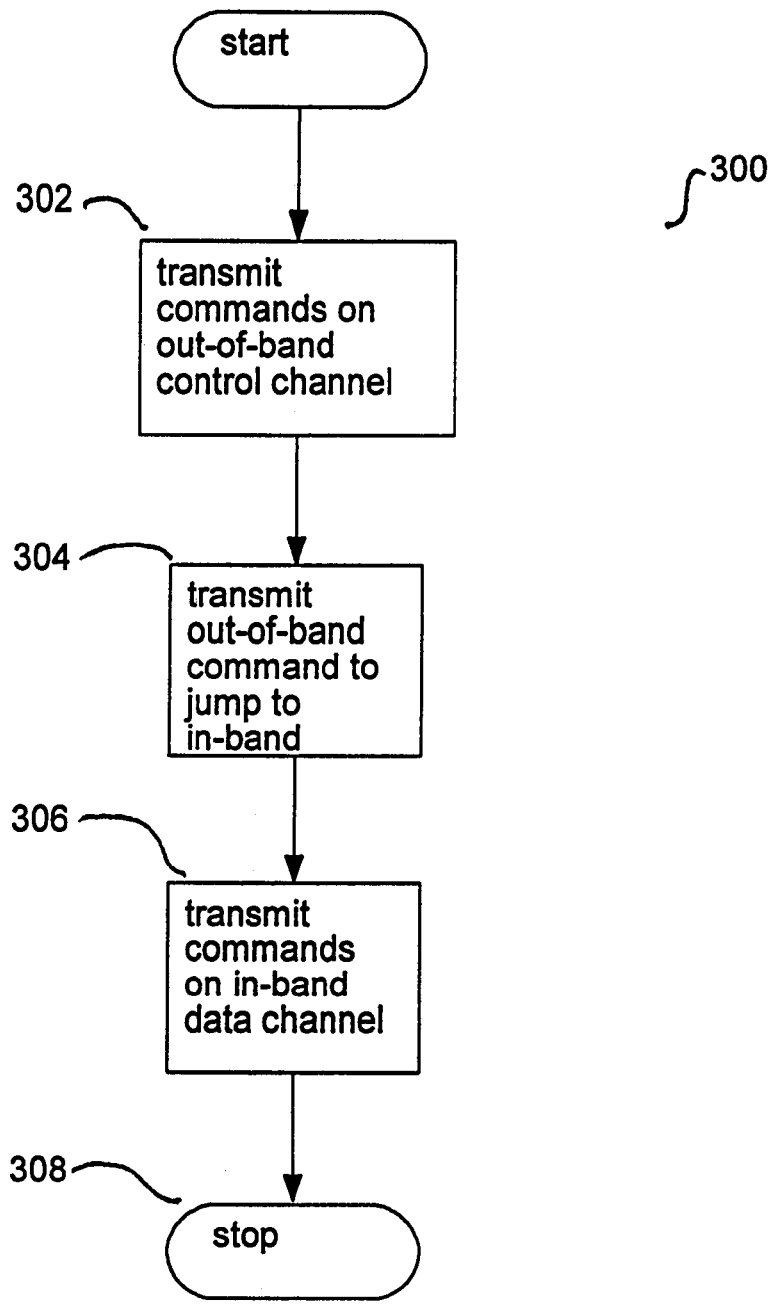
FIG. 3 is a flowchart depicting an example method of transmitting configuration information to a cable television converter terminal, according to a particular embodiment of the present invention.

FIG. 3 is a flowchart illustrating an example method 300 for transmitting control signals to a cable television converter terminal, according to an embodiment of the present invention. In a block 302, an abbreviated command sequence is transmitted to the cable television converter terminal using the out-of-band control channel.

Next, in a block 304, an out-of-band command is transmitted that commands the cable television converter terminal to tune to an in-band data channel, such as Channel 2. In a block 306, the remainder of the configuration information is transmitted on the in-band data channel. By using the higher bandwidth in-band data channel, this configuration data is transmitted more quickly than if it were transmitted on the out-of-band control channel. At a block 308, the process is completed, and the cable television converter terminal is tuned to receive programming signals.

Figure 4:
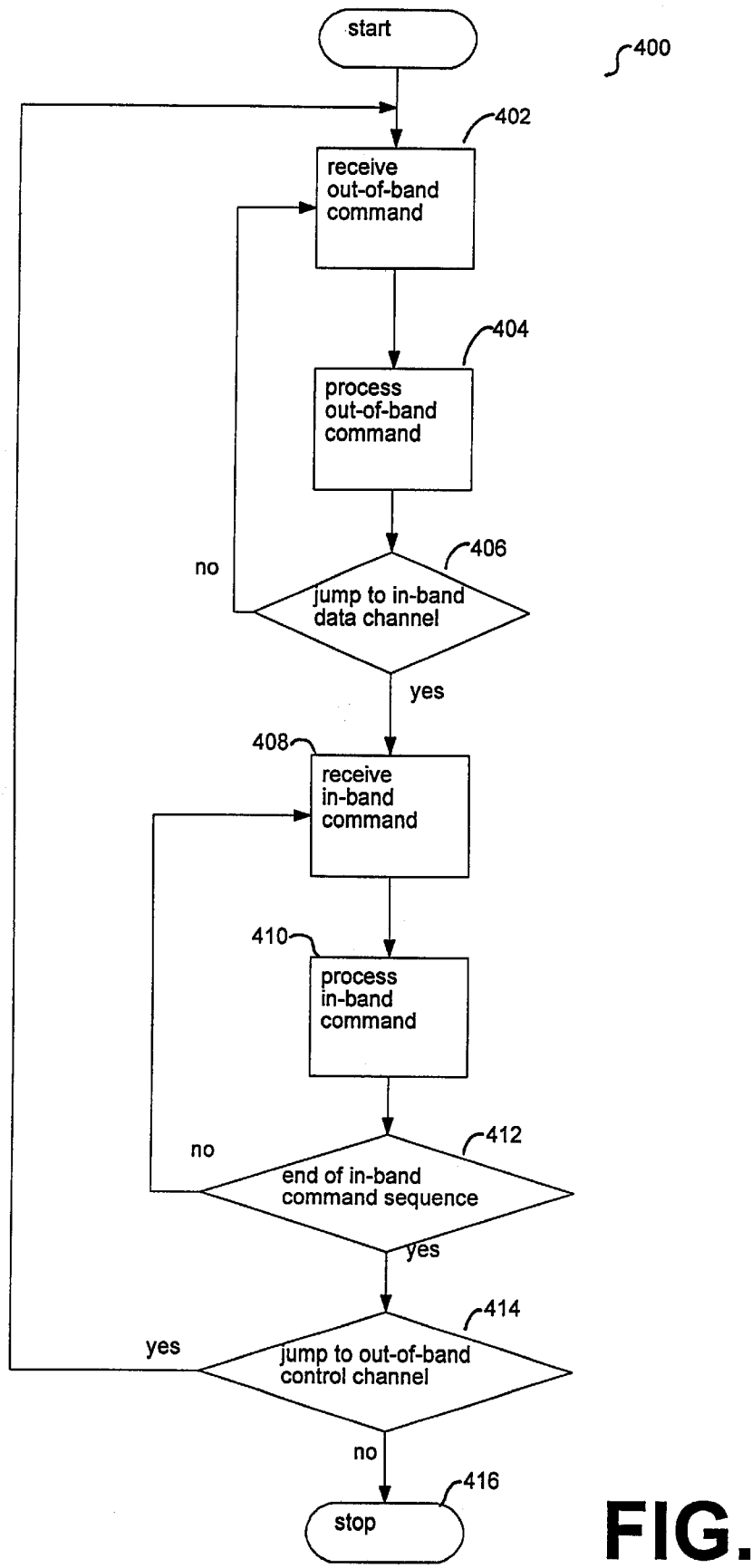
FIG. 4 is a flowchart illustrating an example method for receiving and processing configuration information in a cable television converter terminal, according to another particular embodiment of the present invention.

FIG. 4 is a flowchart depicting an example method 400 for receiving and processing configuration information according to another embodiment of the present invention. In this embodiment, converter terminals requiring different configurations are each properly configured.

At a block 402, the cable television converter terminal receives a first set of configuration data on the out-of-band control channel. This first set of configuration data includes a command which may direct the converter terminal to tune to an in-band channel for the remainder of the configuration data. The first set of configuration data also includes a designator which the converter terminal has been preprogrammed to recognize depending on the manner in which that particular converter terminal is to be configured, e.g., is the converter terminal to descramble some or all of the premium channels.

The command is processed at a block 404 resulting in a decision depicted at block 406. If the command directs the converter terminal to tune to a second in-band control channel for additional configuration data, the terminal does so and the process moves to block 408. If the command does not direct the converter terminal to retune, the converter terminal may continue to monitor the out-of-band control channel, and the process returns to block 402.

When the terminal tunes itself to the in-band data channel in block 408, the terminal may receive a commands and additional configuration information. Data received on the in-band data channel is processed at block 410.

As previously mentioned, the cable system may include converter terminals of different types that interpret and respond to different command sequences and configuration parameters. All versions of the configuration parameters used in the various types of terminals are transmitted on the in-band data channel cyclically. The designator or set of designators received on the out-of-band channel distinguish between the multiple versions of configuration data that are transmitted on the in-band channel.

As part of the command processing at the block 410, the terminal can use its designator to ignore all versions of the configuration data that do not correspond to the particular type its designator and are, therefore, not the appropriate configuration data for that terminal. Thus, this method 400 solves the problem of configuring various types of cable television converter terminals using multiple versions of configuration parameters.

The converter terminal then determines at a block 412 whether the end of the in-band command sequence has been reached. If not, control returns to the block 408, at which the terminal receives additional configuration information on the in-band data channel. If the end of the sequence has been reached, flow proceeds to a decision block 414, at which the terminal may return to the out-of-band control channel, e.g., to receive additional commands from the out-of-band control channel. If so, the process continues to the block 402, and the terminal receives a command on the out-of-band control channel. Ordinarily, however, the process will proceed to a block 416, at which the process ends and the terminal receives programming signals on an in-and-band data channel.

With much of the configuration information transmitted on the in-band data channel at a higher bandwidth than on the out-of-band control channel, cable television converter terminals can be initialized more quickly than in conventional cable television systems. In addition, all terminals receive all operating parameters when they are initialized and are fully functional. Furthermore, a reduced amount of data is transmitted on the out-of-band control channel, relieving traffic congestion on that channel.

As noted above, the present invention may also include providing configuration information that configures the converter or set-top terminal to provide data services as well as cable television services. For example, electronic television programming guides, internet access, electronic mail, world wide web browsing and other data services may be provided over the cable network.

Under the principles of the present invention, a signal on the out-of-band control channel might direct the converter terminal to an in-band channel for configuration data that will allow the terminal to provide any or all of the exemplary data services listed above or any other data services the cable network may provide.

The various embodiments described above are provided by way of illustration only and should not be construed to limit the invention. Those skilled in the art will readily recognize various modifications and changes that can be made to these embodiments without strictly following the example embodiments and applications illustrated and described herein, and without departing from the true spirit and scope of the present invention, which is set forth in the following claims.

What is claimed is:

1. A method for configuring at least one converter terminal on a network, said method comprising:

transmitting first configuration data over an out-of-band channel, said first configuration data having a first command executable by said converter terminal; and transmitting second configuration data using an in-band channel, said second configuration data having a second command executable by said converter terminal, said in-band channel having a bandwidth higher than a bandwidth of said out-of-band channel, wherein said converter terminal is tuned to at least one of an in-band channel different from said in-band channel and an out-of-band channel different from said out-of-band channel to receive additional configuration data.

2. A method, according to claim 1, further comprising: tuning said converter terminal to said in-band channel.

3. A method, according to claim 2, wherein said first command directs said converter terminal to tune to said in-band channel.

4. A method, according to claim 1, wherein said network is a cable television network.

5. A method, according to claim 1, wherein said first and second configuration data configure said converter terminal to receive data services over said network.

6. A method, according to claim 1, wherein said first configuration data includes at least one designator, said at least one designator identifying a subset of said second configuration data to be processed by said converter terminal.

7. A method, according to claim 1, wherein said step of transmitting said second configuration data comprises transmitting a plurality of subsets of configuration data as said second configuration data.

8. A method, according to claim 1, further comprising:

using said out-of-band channel to transmit a first set of configuration data including at least one first designator identified with said converter terminal; and processing a subset of configuration information, subset of configuration information being identified with a second designator that corresponds to said first designator identified with said converter terminal.

9. A method, according to claim 1, wherein the first configuration data includes at least one additional command to be executed by the converter terminal.

10. A method, according to claim 1, wherein said first and second configuration data configure said converter terminal to receive television signals over said network.

11. A configuration arrangement for configuring at least one converter terminal on a network, said arrangement comprising:
- a transmitter, said transmitter transmitting a first set of configuration data over an out-of-band channel and a second set of configuration data over an in-band channel, said first set of configuration data having a first command executable by said converter terminal; and
- said converter terminal receiving said first set of configuration data from said out-of-band channel and said second set of configuration data from said in-band channel,
    - said in-band channel having a bandwidth higher than a bandwidth of said out-of-band channel,
    - wherein said converter terminal receives additional configuration data by tuning said converter terminal to one of a different in-band channel and a different out-of-band channel.

12. A configuration arrangement, according to claim 11, wherein said first command directs said converter terminal to tune to said in-band channel.

13. A configuration arrangement, according to claim 11, wherein said network is a cable television network.

14. A configuration arrangement, according to claim 11, wherein said first and second sets of configuration data configure said converter terminal to receive television signals over said network.

15. A configuration arrangement, according to claim 11, wherein said first and second sets of configuration data configure said converter terminal to receive data services over said network.

16. A configuration arrangement, according to claim 11, wherein said first set of configuration data includes at least one designator, said at least one designator identifying a subset of said second set of configuration data to be processed by said converter terminal.

* * * * *

UNITED STATES PATENT AND TRADEMARK OFFICE
CERTIFICATE OF CORRECTION

PATENT NO.   : 6,425,133 B1
DATED        : July 23, 2002
INVENTOR(S)  : Patrick J. Leary It is certified that error appears in the above-identified patent and that said Letters Patent is hereby corrected as shown below:

Column 2,
Line 62, delete "a particular" first occurrence.

Column 3,
Line 59, replace "transmit." with -- transmit --.

Column 5,
Line 23, replace "receive a commands" with -- receive commands --.
Line 38, replace "type its" with -- type of its --.
Line 55, replace "an in-and band" with -- an in-band --.

Signed and Sealed this

Eighth Day of April, 2003

JAMES E. ROGAN
*Director of the United States Patent and Trademark Office*